United States Patent
Kumar et al.

(10) Patent No.: US 10,992,817 B2
(45) Date of Patent: Apr. 27, 2021

(54) METHODS, SYSTEMS AND COMPUTER READABLE MEDIA FOR SELECTING AND DELIVERING ELECTRONIC VALUE CERTIFICATES USING A MOBILE DEVICE

(75) Inventors: Pradeep Kumar, Fremont, CA (US); Mikel Robert Delagrange, Suwanee, GA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 532 days.

(21) Appl. No.: 12/406,916

(22) Filed: Mar. 18, 2009

(65) Prior Publication Data
US 2010/0241494 A1  Sep. 23, 2010

(51) Int. Cl.
| | |
|---|---|
| *H04M 15/00* | (2006.01) |
| *G06Q 30/06* | (2012.01) |
| *G06Q 20/20* | (2012.01) |
| *G06Q 30/02* | (2012.01) |
| *H04W 4/24* | (2018.01) |

(Continued)

(52) U.S. Cl.
CPC .......... *H04M 15/00* (2013.01); *G06Q 20/204* (2013.01); *G06Q 30/0207* (2013.01); *G06Q 30/0601* (2013.01); *H04M 15/7652* (2013.01); *H04M 15/88* (2013.01); *H04M 17/00* (2013.01); *H04W 4/24* (2013.01); *H04W 12/0609* (2019.01); *H04M 2215/7245* (2013.01); *H04W 4/14* (2013.01); *H04W 8/245* (2013.01)

(58) Field of Classification Search
USPC ......................................................... 705/14
See application file for complete search history.

(56) References Cited

U.S. PATENT DOCUMENTS

| | | |
|---|---|---|
| 5,578,808 A | 11/1996 | Taylor |
| 5,590,038 A | 12/1996 | Pitroda |
| (Continued) | | |

FOREIGN PATENT DOCUMENTS

| | | |
|---|---|---|
| AP | 3452 | 10/2015 |
| AU | 2009282041 | 10/2015 |
| (Continued) | | |

OTHER PUBLICATIONS

NPL—Blaze Mobile Wallet—561018-00014-82759.pdf (Year: 2008).*

(Continued)

*Primary Examiner* — Michael J Sittner
(74) *Attorney, Agent, or Firm* — Jenkins, Wilson, Taylor & Hunt, P.A.

(57) ABSTRACT

Methods, systems, and computer readable media for selecting and delivering an electronic value certificate to a mobile device are disclosed. According to one aspect, the method includes utilizing a certificate selection device to generate electronic certificate selection information and providing the electronic certificate selection information and associated recipient data to a merchant server. From the merchant server, electronic value certificate data derived from the certificate selection information is received. The method also includes establishing a communications link with a mobile device corresponding to the recipient data. The electronic value certificate data is provisioned on the mobile device over the communications link via over the air (OTA) communications.

25 Claims, 4 Drawing Sheets

(51) Int. Cl.
　　*H04W 12/06*　　(2021.01)
　　*H04W 8/24*　　(2009.01)
　　*H04W 4/14*　　(2009.01)
　　*H04M 17/00*　　(2006.01)

(56) References Cited

U.S. PATENT DOCUMENTS

| | | |
|---|---|---|
| 5,884,271 A | 3/1999 | Pitroda |
| 6,078,820 A | 6/2000 | Wells et al. |
| 6,592,044 B1 | 7/2003 | Wong et al. |
| 6,793,135 B1 | 9/2004 | Ryoo |
| 6,999,943 B1 | 2/2006 | Johnson et al. |
| 7,031,693 B2 | 4/2006 | Öhrström et al. |
| 7,103,572 B1 | 9/2006 | Kawaguchi et al. |
| 7,127,236 B2 | 10/2006 | Khan et al. |
| 7,209,733 B2 | 4/2007 | Ortiz et al. |
| 7,308,254 B1 | 12/2007 | Rissanen |
| 7,318,049 B2 | 1/2008 | Iannacci |
| 7,469,151 B2* | 12/2008 | Khan ............... G06Q 30/02 455/406 |
| 7,631,803 B2 | 12/2009 | Peyret et al. |
| 7,783,532 B2* | 8/2010 | Hsu et al. ............... 705/28 |
| 7,942,337 B2 | 5/2011 | Jain |
| 7,954,717 B2 | 6/2011 | Narendra et al. |
| 8,155,999 B2 | 4/2012 | de Boer et al. |
| 8,165,635 B2 | 4/2012 | Khan et al. |
| 8,175,973 B2 | 5/2012 | Davis et al. |
| 8,620,299 B2 | 12/2013 | Kumar |
| 8,639,621 B1 | 1/2014 | Ellis et al. |
| 8,751,317 B2 | 6/2014 | Qawami et al. |
| 9,280,578 B1 | 3/2016 | Zhou et al. |
| 10,546,290 B2 | 1/2020 | Khan et al. |
| 2001/0032182 A1 | 10/2001 | Kumar et al. |
| 2002/0026367 A1 | 2/2002 | Villaret et al. |
| 2002/0091569 A1 | 7/2002 | Kitaura et al. |
| 2002/0138347 A1 | 9/2002 | Sakata |
| 2002/0161640 A1 | 10/2002 | Wolfe |
| 2003/0101246 A1 | 5/2003 | Lahti |
| 2003/0199265 A1 | 10/2003 | Aoyama et al. |
| 2003/0236712 A1 | 12/2003 | Antonucci et al. |
| 2004/0029569 A1 | 2/2004 | Khan et al. |
| 2004/0054591 A1 | 3/2004 | Spaeth et al. |
| 2004/0131185 A1 | 7/2004 | Kakumer |
| 2004/0181463 A1 | 9/2004 | Goldthwaite et al. |
| 2005/0041793 A1 | 2/2005 | Fulton et al. |
| 2005/0070257 A1 | 3/2005 | Saarinen et al. |
| 2005/0172137 A1 | 8/2005 | Hopkins |
| 2006/0023856 A1 | 2/2006 | Welton |
| 2006/0074813 A1 | 4/2006 | Saunders |
| 2006/0080111 A1 | 4/2006 | Homeier-Beals |
| 2006/0165060 A1 | 7/2006 | Dua |
| 2006/0180664 A1* | 8/2006 | Barrett ............... G06Q 30/02 705/14.39 |
| 2006/0236325 A1 | 10/2006 | Rao et al. |
| 2006/0277104 A1 | 12/2006 | Overhultz et al. |
| 2006/0282319 A1 | 12/2006 | Maggio |
| 2007/0016479 A1 | 1/2007 | Lauper |
| 2007/0038560 A1 | 2/2007 | Ansley |
| 2007/0042756 A1 | 2/2007 | Perfetto et al. |
| 2007/0050871 A1 | 3/2007 | Mashhour |
| 2007/0087765 A1 | 4/2007 | Richardson et al. |
| 2007/0099599 A1 | 5/2007 | Smith et al. |
| 2007/0152829 A1 | 7/2007 | Lindsay et al. |
| 2007/0155411 A1 | 7/2007 | Morrison |
| 2007/0174116 A1 | 7/2007 | Keith et al. |
| 2007/0198339 A1 | 8/2007 | Shen et al. |
| 2007/0224979 A1 | 9/2007 | O'Neal et al. |
| 2007/0241183 A1 | 10/2007 | Brown et al. |
| 2007/0241189 A1* | 10/2007 | Slavin ............... G06Q 30/02 235/383 |
| 2007/0278290 A1 | 12/2007 | Messerges et al. |
| 2008/0000965 A1 | 1/2008 | Zellner et al. |
| 2008/0005018 A1 | 1/2008 | Powell |
| 2008/0040354 A1 | 2/2008 | Ray et al. |
| 2008/0051059 A1 | 2/2008 | Fisher |
| 2008/0052164 A1 | 2/2008 | Abifaker |
| 2008/0097851 A1 | 4/2008 | Bemmel et al. |
| 2008/0114884 A1 | 5/2008 | Hewes et al. |
| 2008/0120128 A1 | 5/2008 | Berglund et al. |
| 2008/0126145 A1 | 5/2008 | Rackley, III et al. |
| 2008/0147546 A1 | 6/2008 | Weichselbaumer et al. |
| 2008/0192932 A1 | 8/2008 | Graeber et al. |
| 2008/0195473 A1 | 8/2008 | Laramy et al. |
| 2008/0207184 A1 | 8/2008 | Wassingbo et al. |
| 2008/0238610 A1 | 10/2008 | Rosenberg |
| 2008/0255942 A1 | 10/2008 | Craft |
| 2008/0257958 A1 | 10/2008 | Rothwell et al. |
| 2008/0262928 A1* | 10/2008 | Michaelis ............... G06Q 30/02 705/14.39 |
| 2008/0262929 A1 | 10/2008 | Behr |
| 2009/0055248 A1 | 2/2009 | Wolf |
| 2009/0164322 A1 | 6/2009 | Khan et al. |
| 2009/0192912 A1 | 7/2009 | Griffin et al. |
| 2009/0216606 A1 | 8/2009 | Coffman et al. |
| 2009/0234745 A1 | 9/2009 | Ramer et al. |
| 2009/0265228 A1 | 10/2009 | Sterling et al. |
| 2009/0288012 A1 | 11/2009 | Hertel et al. |
| 2010/0030636 A1 | 2/2010 | Vijayshankar |
| 2010/0041368 A1 | 2/2010 | Kumar |
| 2010/0042517 A1 | 2/2010 | Paintin et al. |
| 2010/0063906 A1 | 3/2010 | Nelsen et al. |
| 2010/0075666 A1 | 3/2010 | Garner |
| 2010/0082420 A1 | 4/2010 | Trifiletti et al. |
| 2010/0094708 A1 | 4/2010 | Natrajan et al. |
| 2010/0125495 A1 | 5/2010 | Smith et al. |
| 2010/0161410 A1 | 6/2010 | Tulloch |
| 2010/0174598 A1 | 7/2010 | Khan et al. |
| 2010/0213253 A1 | 8/2010 | Wollbrand et al. |
| 2010/0312620 A1 | 12/2010 | White et al. |
| 2011/0054986 A1 | 3/2011 | Rubin et al. |
| 2011/0082746 A1 | 4/2011 | Rice et al. |
| 2011/0125565 A1 | 5/2011 | MacIlwaine et al. |
| 2011/0131107 A1 | 6/2011 | Hurst |
| 2011/0161158 A1 | 6/2011 | Lin |
| 2011/0246272 A1 | 10/2011 | Joa et al. |
| 2011/0251892 A1 | 10/2011 | Laracey |
| 2011/0264490 A1 | 10/2011 | Durvasula et al. |
| 2011/0296182 A1 | 12/2011 | Jia et al. |
| 2011/0302011 A1 | 12/2011 | Yoder et al. |
| 2012/0005026 A1 | 1/2012 | Khan et al. |
| 2012/0029997 A1 | 2/2012 | Khan et al. |
| 2012/0041823 A1 | 2/2012 | Khan |
| 2012/0078762 A1 | 3/2012 | Valin et al. |
| 2012/0185314 A1 | 7/2012 | Postrel |
| 2012/0254030 A1 | 10/2012 | Khan et al. |
| 2012/0265625 A1 | 10/2012 | Pletz et al. |
| 2012/0265685 A1 | 10/2012 | Brudnicki et al. |
| 2013/0073336 A1 | 3/2013 | Heath |
| 2013/0103484 A1 | 4/2013 | McLaughlin |
| 2013/0124349 A1 | 5/2013 | Khan et al. |
| 2013/0179495 A1 | 7/2013 | Eom et al. |
| 2013/0197987 A1 | 8/2013 | Doka et al. |
| 2013/0304651 A1 | 11/2013 | Smith |
| 2014/0180802 A1 | 6/2014 | Boal |
| 2016/0042381 A1 | 2/2016 | Braine et al. |
| 2017/0352051 A1 | 12/2017 | Watkins et al. |

FOREIGN PATENT DOCUMENTS

| | | | |
|---|---|---|---|
| CA | 2 546 911 | | 11/2007 |
| CA | 2 546 911 A1 | | 11/2007 |
| CA | 2 755 832 C | | 10/2017 |
| CA | 2734176 | | 7/2019 |
| CN | 1274897 A | | 11/2000 |
| CN | 1585964 A | | 2/2005 |
| CN | 102845040 B | | 5/2016 |
| EP | 1 528 827 A2 | | 5/2005 |
| EP | 2 062 219 B1 | | 7/2015 |
| EP | 2 937 829 A1 | | 10/2015 |
| GB | 2 387 704 A | * | 4/2002 ......... G06Q 20/2014 |
| IN | 330095 | | 1/2020 |
| JP | 2003271815 | | 9/2003 |
| JP | 2006040249 | | 2/2009 |
| KR | 10-2001-0069935 | | 7/2001 |

(56) References Cited

FOREIGN PATENT DOCUMENTS

| KR | 10-2001-0097065 | | 11/2001 |
|---|---|---|---|
| KR | 10-2002-0004566 | A1 | 1/2002 |
| KR | 10-2003-0000447 | | 1/2003 |
| KR | 10-2003-0013973 | | 2/2003 |
| KR | 2003-0068226 | | 8/2003 |
| KR | 10-2004-0032289 | | 4/2004 |
| KR | 10-2007-0021751 | | 2/2007 |
| KR | 10-2007-0051217 | | 5/2007 |
| KR | 10-2008-0021436 | | 3/2008 |
| KR | 10-2008-0025350 | | 3/2008 |
| KR | 10-2010-0034314 | A | 4/2010 |
| KR | 10-2011-0001042 | A | 1/2011 |
| MX | 319439 | | 4/2014 |
| NZ | 200780040617.4 | | 11/2012 |
| SG | 168926 | | 9/2013 |
| WO | WO 03/024139 | A2 | 3/2003 |
| WO | WO 03/046742 | A1 | 6/2003 |
| WO | WO 2004/021240 | A1 | 3/2004 |
| WO | WO 2005/086593 | A2 | 9/2005 |
| WO | WO 2005/098769 | A1 | 10/2005 |
| WO | WO 2005/111882 | A1 | 11/2005 |
| WO | WO 2006/055721 | A2 | 5/2006 |
| WO | WO 2008/030307 | A2 | 3/2008 |
| WO | WO 2008/042302 | A2 | 4/2008 |
| WO | WO 2008/057259 | A2 | 5/2008 |
| WO | WO 2008/135764 | A1 | 11/2008 |
| WO | WO 2009/061139 | A1 | 5/2009 |
| WO | WO 2009/069982 | A2 | 6/2009 |
| WO | WO 2009/079407 | A2 | 6/2009 |
| WO | WO 2009/158681 | A1 | 12/2009 |
| WO | WO 2010/019670 | A1 | 2/2010 |
| WO | WO 2010/071859 | A2 | 6/2010 |
| WO | WO 2011/150369 | A2 | 12/2011 |
| WO | WO 2012/006090 | A2 | 1/2012 |
| WO | WO 2012/024312 | A2 | 2/2012 |
| WO | WO 2012/048122 | A1 | 4/2012 |
| WO | WO 2013/067507 | A1 | 5/2013 |
| WO | WO 2013/163185 | A1 | 10/2013 |
| WO | WO 2016/022929 | A1 | 2/2016 |
| WO | WO 2017/209893 | A1 | 12/2017 |

OTHER PUBLICATIONS

"ViVOnfc Suite," ViVOtech Products, http://www.vivotech.com/products/vivo_nfc/ index.asp, pp. 1-2 (Dec. 31, 2006).
"Giesecke & Devrient provides over the air personalization for handsets with PayPass," NFCNews, pp. 1-2 (Apr. 13, 2006).
"Information technology—Telecommunications and information exchange between systems—Near Field Communications—Interface and Protocol (NFCIP-1)," ISO/IEC 18092, pp. 1-66 (Apr. 1, 2004).
"Identification cards—Contactless integrated circuit(s) cards—Proximity cards—Part 2: Radio frequency power and signal interface," ISO/IEC 14443-2, pp. 1-10 (Jul. 22, 2003).
"Identification cards —Contactless integrated circuit(s) cards—Proximity cards—Part 4: Transmission protocol," ISO/IEC 14443-4, pp. 1-39 (Mar. 10, 2000).
"Identification cards—Contactless integrated circuit(s) cards—Proximity cards—Part 3: Initialization and anticollision," ISO/IEC 14443-3, pp. 1-48 (Jun. 11, 1999).
Communication of European publication number and information on the application of Article 67(3) EPC for European Application No. 11818673.3 (dated May 29, 2013).
Memo Concerning the Official Action for Mexican Patent Application No. MX/a/2011/001622 (dated Apr. 29, 2013).
Final Office Action for U.S. Appl. No. 13/170,903 (dated Apr. 5, 2013).
Communication of European publication number and information on the application of Article 67(3) EPC for European Application No. 11804128.4 (dated Apr. 4, 2013).
Communication Pursuant to Article 94(3) EPC for European Patent Application No. 09807223.4 (dated Mar. 14, 2013).
Communication of European Publication Number and Information on the Application of Article 67(3) EPC for European Patent Application No. 11787521.1 (dated Mar. 13, 2013).
European Search Report for European Patent Application No. 09837222.0 (dated Feb. 12, 2013).
Summons to Attend Oral Proceedings for European Patent Application No. 07836358.7 (dated Feb. 11, 2013).
Notice of Allowance and Fee(s) Due for U.S. Appl. No. 12/190,564 (dated Jul. 10, 2013).
Result of Consultation for European Patent Application No. 07836358.7 (dated Jul. 5, 2013).
Final Office Action for U.S. Appl. No. 13/118,046 (dated Feb. 27, 2015).
Communication of European publication number and information on the application of Article 67(3) EPC for European Application No. 13780892.9 (dated Feb. 4, 2015).
Final Office Action for U.S. Appl. No. 13/669,346 (dated Feb. 20, 2015).
Applicant-Initiated Interview Summary for U.S. Appl. No. 12/651,420 (dated Jan. 26, 2015).
Applicant-Initiated Interview Summary for U.S. Appl. No. 13/211,082 (dated Jan. 26, 2015).
Applicant-Initiated Interview Summary for U.S. Appl. No. 13/118,046 (dated Jan. 23, 2015).
Decision of Rejection for Chinese Application No. 200980140368.5 (dated Jan. 7, 2015).
Communication under Rule 71(3) EPC for European Patent Application No. 07836358.7 (dated Dec. 17, 2014).
Final Office Action for U.S. Appl. No. 13/170,903 (dated Dec. 9, 2014).
Communication pursuant to Article 94(3) EPC for European Application No. 11 787 521.1 (dated Oct. 27, 2014).
Non-Final Office Action for U.S. Appl. No. 13/118,046 (dated Sep. 25, 2014).
Non-Final Office Action for U.S. Appl. No. 13/669,346 (dated Sep. 18, 2014).
Non-Final Office Action for U.S. Appl. No. 13/211,082 (dated Sep. 8, 2014).
Non-Final Office Action for U.S. Appl. No. 12/651,420 (dated Sep. 3, 2014).
Non-Final Office Action for U.S. Appl. No. 13/170,903 (dated Aug. 22, 2014).
Communication of European publication number and Information on the application of Article 37(3) EPC for European Application No. 12846583.8 (dated Aug. 13, 2014).
Notification of the First Office Action for Chinese Application No. 200980157050.8 (dated Aug. 4, 2014).
Examination Report for ARIPO Patent Application No. AP/P/2011/005619 (dated Jul. 30, 2014).
Extended European Search Report for European Application No. 11804128.4 (dated Jul. 21, 2014).
Communication under Rule 71(3) EPC for European Patent Application No. 07836358.7 (dated Jul. 2, 2014).
Examination Report for Australian Patent Application No. 2009282041 (dated Jun. 12, 2014).
Communication pursuant to Article 94(3) EPC for European Application No. 09 837 222.0 (dated Apr. 23, 2014).
Non-Final Office Action for U.S. Appl. No. 13/118,046 (dated Apr. 16, 2014).
Notification of the Third Office Action for Chinese Application No. 200980140368.5 (dated Apr. 8, 2014).
Office Action for Indian Application No. 1752/CHENP/2009 (dated Mar. 27, 2014).
Decision to Refuse for European Application No. 09 807 223.4 (dated Mar. 18, 2014).
Extended European Search Report for European Application No. 11787521.1 (dated Feb. 28, 2014).
Notice of Allowance for Mexican Patent Application No. MX/a/2011/001622 (dated Feb. 20, 2014).
Extended European Search Report for European Application No. 11818673.3 (dated Jan. 31, 2014).
Non-Final Office Action for U.S. Appl. No. 13/211,082 (dated Dec. 30, 2013).

(56) References Cited

OTHER PUBLICATIONS

Extended European Search Report for European Application No. 09833865.0 (dated Dec. 12, 2013).
Result of Consultation for European Application No. 09 807 223.4 (dated Dec. 6, 2013).
Communication pursuant to Article 94(3) EPC for European Application No. 09 837 222.0 (dated Oct. 21, 2013).
Third Office Action for Mexican Patent Application No. MX/a/2011/001622 (dated Oct. 11, 2013).
Final Office Action for U.S. Appl. No. 13/118,046 (dated Oct. 2, 2013).
Summons to attend oral proceedings pursuant to Rule 115(1) EPC for European Application No. 09807223.4 (dated Sep. 25, 2013).
Notification of Transmittal of the International Search Report and the Written Opinion of the International Searching Authority, or the Declaration for International Application No. PCT/US2013/037803 (dated Aug. 21, 2013).
Final Office Action for U.S. Appl. No. 12/651,420 (dated Aug. 2, 2013).
Result of consultation for European Application No. 07 836 358.7 (dated Jul. 18, 2013).
Second Office Action for Chinese Patent Application No. 200980140368.5 (dated Jun. 4, 2013).
Notification of Transmittal of the International Search Report and the Written Opinion of the International Searching Authority, or the Declaration for International Patent Application No. PCT/US2012/063568 (dated Mar. 26, 2013).
Data Management, EMV Integrated Circuit Card Specifications for Payment Systems, Book 4: Cardholder, Attendant, and Acquirer Interface Requirements, Version 4.2, pp. 81-94 (Jun. 2008).
"Identification cards—Integrated circuit cards—Part 4: Organization, security and commands for interchange," ISO/IEC 7816-4, Second Edition, pp. 1-90 (Jan. 15, 2005).
"Information technology—Identification cards—Integrated circuit(s) cards with contacts—Part 5: Registration of application providers," ISO/IEC 7816-5.2, pp. 1-12 (Jan. 17, 2003).
"Information technology—Identification cards—Integrated circuit(s) cards with contacts—Part 4: Interindustry commands for interchange," ISO/IEC 7816-4, pp. 1-85 (Jan. 17, 2003).
"Identification cards—Integrated circuit(s) cards with contacts—Part 5: Numbering system and registration procedure for application identifiers," ISO/IEC 7816-5, Amendment 1, pp. 1-8 (Dec. 15, 1996).
"Identification cards—Integrated circuit(s) cards with contacts—Part 5: Numbering system and registration procedure for application identifiers," ISO/IEC 7816-5, First Edition, pp. 1-12 (Jun. 15, 1994).
Final Office Action for U.S. Appl. No. 12/190,564 (dated Jan. 11, 2013).
Non-Final Official Action for U.S. Appl. No. 13/170,903 (dated Oct. 23, 2012).
Memo Concerning the Official Action for Mexican Patent Application No. MX/a/2011/001622 (dated Oct. 16, 2012).
Non-Final Official Action for U.S. Appl. No. 13/118,046 (dated Oct. 3, 2012).
Non-Final Official Action for U.S. Appl. No. 12/651,420 (dated Sep. 12, 2012).
European Search Report for European Application No. 10754103.9 (dated Aug. 20, 2012).
Chinese Patent Application No. 200780040617.4 for Notice of Granting Patent Right for Invention (dated Aug. 3, 2012).
First Office Action for Chinese Patent Application No. 200980140368.5 (dated Jul. 30, 2012).
Communication pursuant to Article 94(3) EPC for European Application No. 07 836 358.7 (dated Jul. 4, 2012).
Non-Final Official Action for U.S. Appl. No. 12/190,564 (dated Jun. 4, 2012).
Extended European Search Report for European Application No. 09807223.4 (dated Jun. 1, 2012).

Notification of Transmittal of the International Search Report and the Written Opinion of the International Searching Authority, or the Declaration for International Application No. PCT/US2011/047945 (dated Mar. 28, 2012).
"Notice from the European Patent Office dated Oct. 1, 2007 concerning business methods," Official Journal EPO, pp. 592-593 (dated Nov. 2007).
Communication pursuant to Article 94(3) EPC for European Patent Application No. 09 837 222.0 (dated Apr. 18, 2016).
Advisory Action Before the Filing of an Appeal Brief for and Applicant-Initiated Interview Summary for U.S. Appl. No. 13/669,346 (dated Apr. 18, 2016).
Office Action for Canadian Patent Application No. 2,755,832 (dated Apr. 6, 2016).
Examiner's Answer for U.S. Appl. No. 13/118,046 (dated Apr. 4, 2016).
Notice of Grant for Chinese Patent Application No. 200980157050.8 (dated Feb. 3, 2016).
Communication pursuant to Article 94(3) EPC for European Patent Application No. 12846583.8 (dated Jan. 22, 2016).
Extended European Search Report for European Application No. 13780892.9 (dated Jan. 15, 2016).
Non-Final Office Action for U.S. Appl. No. 13/170,903 (dated Jan. 8, 2016).
Office Action for Canadian Application No. 2,734,176 (dated Jan. 6, 2016).
Final Office Action for U.S. Appl. No. 13/669,346 (dated Dec. 30, 2015).
Communication pursuant to Article 94(3) EPC for European Patent Application No. 11787521.1 (dated Dec. 17, 2015).
Notification of the Reexamination for Chinese Application No. 200980140368.5 (dated Oct. 28, 2015).
Communication pursuant to Article 94(3) EPC for European Application No. 11 804 128.4 (dated Oct. 23, 2015).
Certificate of Grant for Australian Patent Application No. 2009282041 (dated Oct. 22, 2015).
Oral Hearing Notice for Indian Patent Application No. 1752/CHENP/2009 (dated Oct. 13, 2015).
Third Office Action for Chinese Patent Application No. 200980157050.8 (dated Oct. 9, 2015).
Notification of European publication number and information on the application of Article 67(3) EPC for European Patent Application No. 15165149.4 (dated Sep. 30, 2015).
Extended European Search Report for European Application No. 15165149.4 (dated Aug. 27, 2015).
Langer et al., "Anwendungen und Technik von Near Field Communication (NFC)," Springer, 275 pages (2010).
Restriction and/or Election Requirement for U.S. Appl. No. 13/453,707 (dated Sep. 16, 2015).
Advisory Action Before the Filing of an Appeal Brief for U.S. Appl. No. 12/651,420 (dated Aug. 17, 2015).
Advisory Action Before the Filing of an Appeal Brief, Examiner-Initiated Interview Summary, and AFCP 2.0 Decision for U.S. Appl. No. 13/211,082 (dated Jul. 20, 2015).
Communication pursuant to Article 94(3) EPC for European Application No. 11 787 521.1 (dated Jul. 15, 2015).
Non-Final Office Action for U.S. Appl. No. 13/669,346 (dated Jul. 15, 2015).
Notice of Acceptance for Australian Application No. 2009282041 (dated Jun. 29, 2015).
Decision to grant a European patent pursuant to Article 97(1) EPC for European Application No. 07836358.7 (dated Jun. 18, 2015).
Advisory Action, Applicant-Initiated Interview Summary, & AFCP 2.0 Decision for U.S. Appl. No. 13/669,346 (dated Jun. 15, 2015).
Extended European Search Report for European Patent Application No. 12846583.8 (dated May 19, 2015).
Final Office Action for U.S. Appl. No. 13/211,082 (dated May 7, 2015).
Final Office Action for U.S. Appl. No. 12/651,420 (dated May 4, 2015).
Notification of Decision to Grant or Register for ARIPO Application No. AP/P/2011/005619 (dated Apr. 28, 2015).

(56) References Cited

OTHER PUBLICATIONS

Second Office Action for Chinese Patent Application No. 200980157050.8 (dated Apr. 1, 2015).
Final Office Action for U.S. Appl. No. 13/211,082 (dated Dec. 20, 2016).
Non-Final Office Action for U.S. Appl. No. 14/455,453 (dated Dec. 15, 2016).
Final Office Action for U.S. Appl. No. 13/669,346 (dated Dec. 1, 2016).
Summons to attend oral proceedings pursuant to Rule 115(1) EPC for European Application No. 12846583.8 (dated Oct. 10, 2016).
Decision on Appeal for U.S. Appl. No. 13/118,046 (dated Sep. 14, 2016).
Advisory Action for U.S. Appl. No. 13/170,903 (dated Aug. 22, 2016).
Non-Final Office Action for U.S. Appl. No. 13/669,346 (dated Jul. 25, 2016).
Communication pursuant to Article 94(3) EPC for European Application No. 10 754 103.9 (dated Jul. 14, 2016).
Communication pursuant to Article 94(3) EPC for European Patent Application No. 11 818 673.3. (dated Jul. 13, 2016).
Examiner's Answer for U.S. Appl. No. 12/651,420 (dated Jul. 1, 2016).
Summons to attend oral proceedings pursuant to Rule 115(1) EPC for European Patent Application No. 11787521.1 (dated Jun. 29, 2016).
Summons to attend oral proceedings pursuant to Rule 115(1) EPC for European Patent Application No. 11804128.4 (dated Jun. 27, 2016).
Non-Final Office Action for U.S. Appl. No. 13/211,082 (dated Jun. 17, 2016).
Commonly-assigned, co-pending U.S. Appl. No. 15/172,123 for "Methods, Systems, and Computer Readable Media for Providing a Personalized Offers Integration Platform," (Unpublished, filed Jun. 2, 2016).
Final Office Action for U.S. Appl. No. 13/170,903 (dated Jun. 2, 2016).
Decision of Reexamination for Chinese Application No. 200980140368.5 (dated May 30, 2016).
Non-Final Office Action for U.S. Appl. No. 13/453,707 (dated May 19, 2016).
Notification of Transmittal of the International Search Report and the Written Opinion of the International Searching Authority, or the Declaration for International Application No. PCT/US2015/044231 (dated Oct. 23, 2015).
Adelya Loyalty Operator, Welcome and Plaform, http://www.adelya.com/, pp. 1-2 (Oct. 2014).
AmazonSmile, About AmazonSmile: Program Details and FAQ, http://smile.amazon.com/about, 1 page (Oct. 2014).
Choose Local Orgeon Visa, http://chooselocalvisa.com, Credit Card Rates for Choose Local Visa, https://www.unitusccu.com/personal/personal-credit-cards/rates/, 5 pages (Oct. 2014).
Groupon, Wikipedia, http://en.wikipedia.org/wiki/Groupon, pp. 1-17 (Oct. 2014).
MasterCard Marketplace, https://www.mastercard.com/us/company/en/whatwedo/.
Orange Advantage Rewards Program, About the Program and How it Works, http://orangeadvantageny.com/who-we-are/, 3 pages, (Sep. 2014).
Simon, "Credit card reward programs: a short history," captured by wayback machine Jan. 19, 2009, pp. 1-2 (Published Nov. 14, 2006).
Latif et al., "Automated notification and document downloading in E-learning—development of an agent-based framework utilizing the push-pull technology interaction policy", Information Technology, 2008, ITSIM 2008. International Symposium On, IEEE, Piscataway, NJ, USA 26, p. 1-7 (Aug. 26, 2008).
Decision on Appeal for U.S. Appl. No. 12/651,420 (dated Aug. 25, 2017).
Advisory Action for U.S. Appl. No. 14/455,453 (dated Aug. 11, 2017).
Communication pursuant to Article 94(3) EPC for European Patent Application No. 11 818 673.3 (dated Jul. 31, 2017).
Notification of Transmittal of the International Search Report and the Written Opinion of the International Searching Authority, or the Declaration for International Application No. PCT/US2017/031220 (dated Jun. 29, 2017).
Summons to attend oral proceedings pursuant to Rule 115(1) EPC for European Patent Application. No. 9837222.0 (dated May 31, 2017).
Non-Final Office Action for U.S. Appl. No. 13/118,046 (dated Jun. 20, 2017).
Advisory Action Before the Filing of an Appeal Brief for U.S. Appl. No. 13/453,707 (dated Jun. 14, 2017).
Final Office Action for U.S. Appl. No. 14/455,453 (dated May 31, 2017).
Notice of Allowance and Fee(s) due for U.S. Appl. No. 13/669,346 (dated May 4, 2017).
Advisory Action for U.S. Appl. No. 13/211,082 (dated Apr. 19, 2017).
Final Office Action for U.S. Appl. No. 13/453,707 (dated Mar. 31, 2017).
Communication pursuant to Article 94(3) EPC for European Application No. 15 165 149.4 (dated Mar. 22, 2017).
Applicant-Initiated Interview Summary for U.S. Appl. No. 14/455,453 (dated Mar. 20, 2017).
Decision to refuse a European Patent application for European Application No. 11 804 128.4 (dated Mar. 8, 2017).
Examiner's Answer to Appeal Brief for U.S. Appl. No. 13/170,903 (dated Mar. 1, 2017).
Notice of Allowance for Canadian Patent Application No. 2,755,832 (dated Feb. 27, 2017).
Advisory Action for U.S. Appl. No. 13/669,346 (dated Feb. 10, 2017).
Result of consultation for European Application No. 11 804 128.4 (dated Feb. 9, 2017).
Canadian Office Action for Canadian Application No. 2,734,176 (dated Dec. 21, 2016).
Advisory Action and AFCP 2.0 Decision for U.S. Appl. No. 13/453,707 (dated May 31, 2018).
Advisory Action Before the Filing of an Appeal Brief for U.S. Appl. No. 14/455,453 (dated May 29, 2018).
Applicant-Initiated Interview Summary for U.S. Appl. No. 14/455,453 (dated May 11, 2018).
Non-Final Office Action for U.S. Appl. No. 13/118,046 (dated Jul. 3, 2008).
Summons to attend oral proceedings pursuant to Rule 115 (1) EPC for European Patent Application Serial No. 09833865.0 (dated Jul. 23, 2018).
Non-Final Office Action for U.S. Appl. No. 15/172,123 (dated Jul. 23, 2018).
Brief Communication for European Patent Application No. 09837222.0 (dated Jan. 16, 2018).
Advisory Action for U.S. Appl. No. 13/118,046 (dated Jan. 4, 2018).
Office Action for Canadian Patent Application No. 2,734,176 (dated Nov. 29, 2017).
Non-Final Office Action for U.S. Appl. No. 14/455,453 (dated Oct. 24, 2017).
Final Office Action for U.S. Appl. No. 13/118,046 (dated Oct. 24, 2017).
Examiner's Answer for U.S. Appl. No. 13/211,082 (dated Oct. 20, 2017).
Non-Final Office Action for U.S. Appl. No. 13/453,707 (dated Oct. 2, 2017).
Communication pursuant to Article 94(3) EPC for European Patent Application No. 13 780 892.9 (dated Aug. 31, 2017).
Final Office Action for U.S. Appl. No. 14/455,453 (dated Mar. 9, 2018).
Final Office Action for U.S. Appl. No. 13/453,707 (dated Feb. 23, 2018).
Summons to attend oral proceedings pursuant to Rule 115(1) EPC for European Patent Application No. 11787521.1 (dated Feb. 20, 2018).

(56) References Cited

OTHER PUBLICATIONS

Summons to attend oral proceedings pursuant to Rule 115(1) EPC for European Patent Application No. 10754103.9 (dated Feb. 19, 2018).
Decision to refuse a European Patent application for European Patent Application No. 09 837 222.0 (dated Jan. 25, 2018).
Summons to attend oral proceedings pursuant to Rule 115(1) EPC for European Patent Application No. EP15165149.4 (dated Jan. 19, 2018).
Communication pursuant to Article 94(3) EPC for European Patent Application No. 09 833 865.0 (dated Dec. 11, 2017).
Final Office Action for U.S. Appl. No. 15/172,123 (dated Dec. 4, 2018).
Notice of Allowance for Canadian Patent Application Serial No. 2,734,176 (dated Nov. 20, 2018).
Decision to refuse a European Patent application for European Patent Application Serial No. 15 165 149.4 (dated Nov. 16, 2018).
Non-Final Office Acton for U.S. Appl. No. 13/118,046 (dated Nov. 13, 2018).
Decision to refuse a European Patent application for European Patent Application Serial No. 11 787 521.1 (dated Nov. 7, 2018).
Final Office Action for U.S. Appl. No. 13/118,046 (dated Mar. 19, 2019).
Summons to attend oral proceedings pursuant to Rule 115(1) EPC for European Application Serial No. 13780892.9 (dated Feb. 28, 2019).
Decision on Appeal for U.S. Appl. No. 13/211,082 (dated Feb. 27, 2019).
Notification of the First Office Action for Chinese Patent Application Serial No. 201610770773.7 (dated Dec. 29, 2018).
First Examination Report for Indian Patent Application Serial No. 1560/CHENP/2011 (dated Oct. 30, 2018).
Decision on Appeal for U.S. Appl. No. 13/170,903 (dated Nov. 1, 2018).
Applicant-Initiated Interview Summary for U.S. Appl. No. 15/172,123 (dated Oct. 23, 2018).
Result of consultation for European Patent Application No. 11 787 521.1 (dated Sep. 26, 2018).
Office Action for Indian Patent Application Serial No. 5233/CHENP/2011 (dated Sep. 24, 2018).
Non-Final Office Action for U.S. Appl. No. 13/453,707 (dated Sep. 4, 2018).
Decision to refuse a European Patent application for European Patent Application Serial No. 10 754 103.9 (dated Aug. 10, 2018).
Non-Final Office Action for U.S. Appl. No. 13/453,707 (dated Jul. 24, 2020).
Decision of Rejection for Chinese Patent Application Serial No. 201610238147.3 (dated Jan. 3, 2020).
Decision to Refuse a European Patent Application for European Application Serial No. 13 780 892.9 (dated Jan. 9, 2020).
Result of consultation for European Application Serial No. 13 780 892.9 (dated Oct. 21, 2019).
Examination Report for Australian Application Serial No. 2017274295 (dated Oct. 2, 2019).
Notification of the Second Office Action for Chinese Patent Application Serial No. 201610238147.3 (dated Sep. 24, 2019).
Examination Report for Australian Patent Application Serial No. 2017274295 (dated Sep. 30, 2020).
Hearing Notice for Indian Patent Application Serial No. 1560/CHENP/2011 (dated Sep. 22, 2020).
Examination Report for Australian Patent Application Serial No. 2017274295 (dated Jul. 21, 2020).
Notice of Granting Patent Right for Invention for Chinese Application Serial No. 201610545858.5 (dated Sep. 6, 2019).
Communication pursuant to Article 94(3) EPC for European Application Serial No. 11 818 673.3 (dated Aug. 9, 2019).
Communication pursuant to Article 94(3) EPC for European Application Serial No. 09 819 787.4 (dated Aug. 9, 2019).
Notice of Allowance and Fee(s) Due for U.S. Appl. No. 15/688,270 (dated Aug. 6, 2019).
Decision of Rejection for Chinese Patent Application Serial No. 201610770773.7 (dated Jul. 2, 2019).
Advisory Action for U.S. Appl. No. 13/118,046 (dated May 31, 2019).
Examiner's Answer for U.S. Appl. No. 15/172,123 (dated May 28, 2019).
Advisory Action for U.S. Appl. No. 15/172,123 (dated Apr. 11, 2019).
Decision to Refuse for European Patent Application No. 09833865.0 (dated Mar. 27, 2019).
Final Office Action for U.S. Appl. No. 13/453,707 (dated Mar. 22, 2019).
Notification of the First Office Action for Chinese Patent Application Serial No. 201610238147.3 (dated Mar. 5, 2019).
White, "How Computers Work," Seventh Edition, pp. 1-44 (2004).
Applicant-Initiated Interview Summary for U.S. Appl. No. 13/453,707 (dated Oct. 26, 2020).
Applicant-Initiated Interview Summary for U.S. Appl. No. 13/453,707 (dated Oct. 20, 2020).
Communication Pursuant to Article(3) EPC for European Patent Application Serial No. 11818673.3 (dated Nov. 16, 2020).
Communication Pursuant to Article(3) EPC for European Patent Application Serial No. 09819787.4 (dated Nov. 16, 2020).
Official Letter Notifying Grant and Copy of Patent Certificate for Indian Patent No. 352836 (dated Feb. 12, 2020).
Summons to Oral Proceedings Pursuant to Rule 115(1) EPC for European Patent Application Serial No. 09807223.4 (dated Oct. 30, 2020).
Final Office Action for U.S. Appl. No. 13/453,707 (dated Feb. 11, 2021).
Decision on Appeal for U.S. Appl. No. 15/172,123 (dated Feb. 23, 2021).

* cited by examiner

METHODS, SYSTEMS AND COMPUTER READABLE MEDIA FOR SELECTING AND DELIVERING ELECTRONIC VALUE CERTIFICATES USING A MOBILE DEVICE

TECHNICAL FIELD

The subject matter described herein relates to the selection and delivery of electronic coupons and promotions utilizing a mobile device. More particularly, the subject matter described herein relates to methods, systems, and computer readable media for selecting and delivering electronic value certificates using a mobile device.

BACKGROUND

Currently, the primary means for acquiring coupons or promotions are from tangible printed paper certificates (e.g., a coupon or paper flyer) distributed by a merchant or product company. In order to utilize the coupon (or promotion), the consumer typically cuts out the coupon from a flyer and presents the coupon to a cashier while conducting a purchase transaction involving a good associated with the coupon. Notably, this process is a completely manual process. Furthermore, the coupon is usually embodied as a tangible, physical card or paper cutout. As such, the fact the coupon is a tangible, physical object may give rise to several problems. For instance, due to its size, the physical coupon may be readily misplaced, stolen, or even damaged prior to the consumer using the coupon at the store.

Accordingly, there exists a need for methods, systems, and computer readable media for selecting and delivering electronic value certificates using a mobile device.

SUMMARY

Methods, systems, and computer readable media for selecting and delivering electronic value certificates using a mobile device are disclosed. According to one aspect, the method includes receiving, at a merchant server, certificate selection information and associated recipient data from a certificate selection device. From the merchant server, electronic value certificate data derived from the certificate selection information is received. The method also includes establishing a communications link with a mobile device corresponding to the recipient data. The electronic value certificate data is provisioned on the mobile device over the communications link via over the air (OTA) communications.

The subject matter described herein for selecting and delivering an electronic value certificate using a mobile device may be implemented using a computer readable medium having stored thereon computer executable instructions that when executed by the processor of a computer perform steps of the aforementioned method (see above). Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for selecting and delivering an electronic value certificate using a mobile device described herein. In addition, a computer readable medium that implements the subject matter described herein may be distributed across multiple physical devices and/or computing platforms.

BRIEF DESCRIPTION OF THE DRAWINGS

The subject matter described herein will now be explained with reference to the accompanying drawings of which.

DETAILED DESCRIPTION

Figure 1:
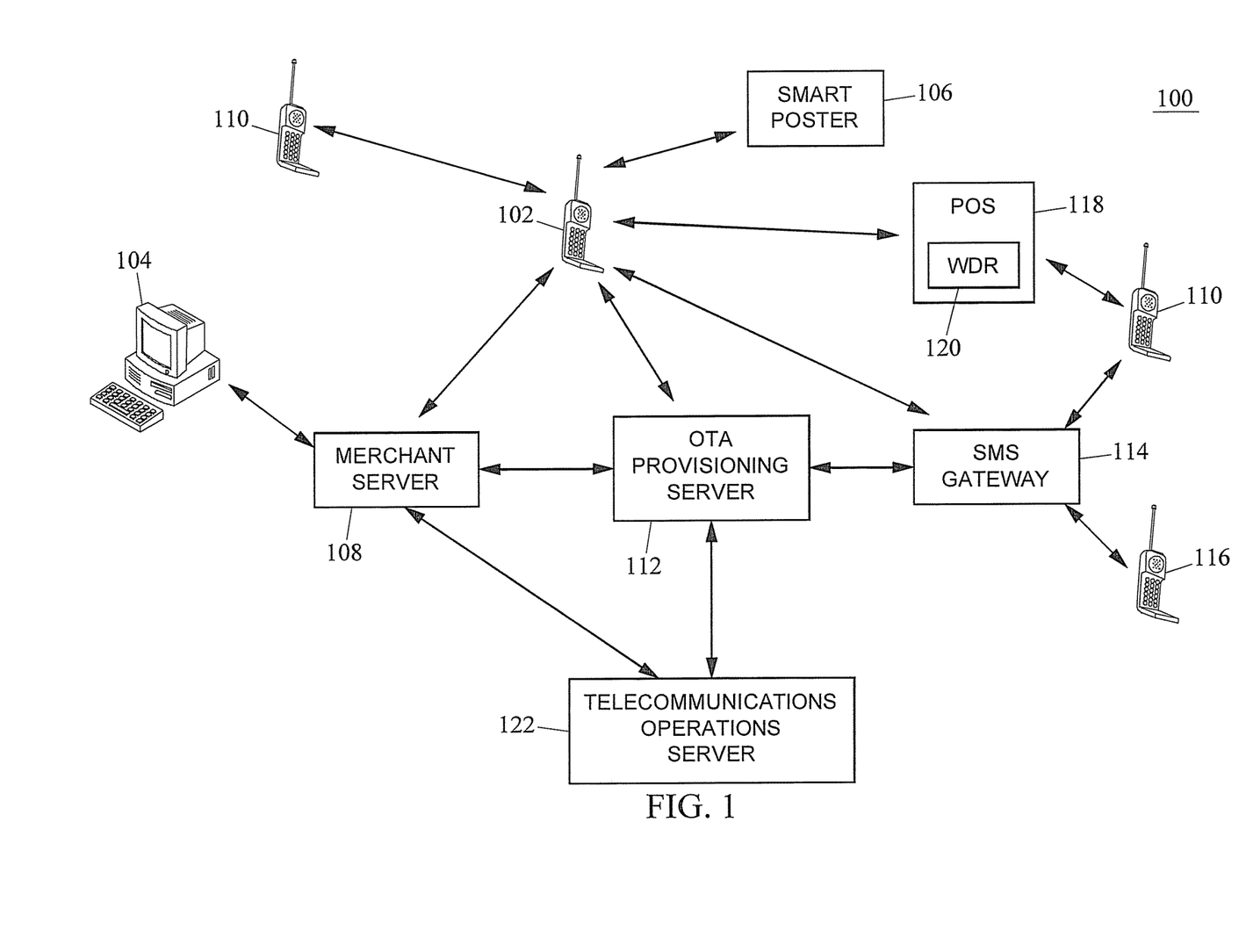
FIG. 1 is a block diagram of an exemplary system for selecting and delivering an electronic value certificate to a mobile device according to an embodiment of the subject matter described herein.

FIG. 1 is a block diagram of an exemplary system 100 for selecting and delivering an electronic value certificate (e.g., an electronic coupon, promotion, or the like) to a mobile device according to an embodiment of the subject matter described herein. In one embodiment, system 100 comprises a plurality of components, which may include a user mobile device 102, a plurality of certificate selection devices (e.g., a computer 104 and a smart poster 106), a merchant server 108, an NFC enabled recipient mobile device 110, OTA provisioning server 112, SMS gateway 114, a non-NFC enabled recipient mobile device 116, a point of sale (POS) terminal 118, and a telecommunications operations server 122. Notably, mobile device 102 and computer 104 provide a user with the means to select an electronic value certificate (e.g., an electronic coupon, promotion, and the like) from a merchant website for delivery to a recipient mobile device.

In one embodiment, a user utilizes a certificate selection device, such as computer 104, which may include a personal computer (e.g., at the user's home) or a kiosk station (e.g., a designated computer device provided by a merchant that may be positioned at or near a merchant/retail store location, and may be used to perform consumer-related tasks associated to a particular merchant, such as selecting electronic coupons), to access a merchant's web site. As used herein, the term "merchant" may include a seller, a retailer, or any other entity that is in the business of selling goods or providing services. By using the interface afforded by the merchant web site, the user may select an electronic value certificate that the user wishes to download to a handheld mobile device (e.g., mobile device 102 or recipient devices 110, 116). After making the desired electronic value certificate selection(s), the user may be prompted to provide electronic value certificate delivery information. For example, delivery information may comprise recipient data, such as the user's phone number or the phone number of a third party recipient. Depending on the embodiment/scenario, mobile device 102 may either be an NFC enabled mobile device or a non-NFC enabled mobile device.

As mentioned above, system 100 may also include a merchant server 108, an over-the-air (OTA) provisioning server 112, and a telecommunications operations server 122.

In one embodiment, merchant server 108 may comprise a backend server that is associated with a particular merchant, retailer, or Internet-based store. Merchant server 108 may be configured to store various electronic coupons or promotions data which may be displayed on a web site accessible to users. OTA provisioning server 112 may include a server that is responsible for receiving electronic value certificate selection information from various merchant servers (e.g., merchant server 108) as well as issuing electronic value certificates to mobile devices (e.g., mobile devices 102, 116, as explained below) per the instructions and information received from each respective merchant server. In one embodiment, the functions provided by OTA provisioning server 112 may be performed by a plurality of servers (e.g., a control server, which provides OTA administrative services for the secure element on a mobile device, and an issuer server, which provides a secure local provisioning point for issuing electronic coupons to a mobile device in order to allow an issuer to maintain full possession and control of provisioned data) as opposed to a single stand-alone server. Telecommunications operator server 122 may include a server associated with a telecommunications service provider (e.g., a wireless phone service provider) that is capable of providing information related to a given mobile device and/or phone number. For example, server 110 may contain phone numbers and the type of mobile device associated with each phone number.

As mentioned above, system 100 may also include an NFC enabled recipient mobile device 110, a non-NFC enabled recipient mobile device 116 and a POS terminal 118. As used herein, the term "recipient" refers to a party that receives the electronic value certificate in the form of a softcard containing a barcode image or via a short message service (SMS) message containing a certificate authorization code or uniform resource locator (URL) linked to a barcode image that may subsequently be scanned at POS terminal 118.

An NFC enabled mobile device (e.g., mobile device 110) may comprise a mobile phone with embedded NFC support circuitry/software, which enables a user to wirelessly communicate with wireless device reader 120. Similarly, an NFC enabled mobile device may include universal subscriber identification module (USIM)/USIM integrated circuit card (UICC) NFC support circuitry/software to wirelessly communicate with the wireless device reader.

Non-NFC enabled mobile device 116 may include a cellular phone or other mobile device that does not include embedded NFC or USIM/UICC NFC support circuitry/software or any other means to wirelessly communicate with POS terminal 118. In one embodiment, POS terminal 118 may include a wireless device reader 120 (e.g., a wireless RFID reader or a contactless card reader) that is capable of reading NFC enabled mobile devices, wireless smart cards or any other contactless payment type device. In one embodiment, wireless device reader 120 may be configured to wirelessly communicate with NFC-enabled mobile device 102 via an electromagnetic field.

As mentioned above, one type of communications channel that may be used between a device capable of supporting a softcard and a wireless device reader for payment/coupon transactions is near field communications (NFC). Near field communications typically occur at a distance of within about one wavelength of the communications frequency being used between the mobile device and the wireless device reader. An example of a contactless communications protocol that may be used in communications between a device capable of supporting a softcard and a wireless device reader is an ISO 14443 interface.

Devices with wireless communications capabilities may also be capable of data communications with remote entities. For example, devices with wireless communications capabilities may implement HTTP over TCP/IP over-the-air interface for communicating with remote entities. The air interface protocol used by a device with wireless communications capabilities may vary with the device. Examples of air interface protocols that may be used include GSM, GPRS, CDMA, Bluetooth, etc.

Specifically, NFC involves communication via magnetic field induction, where two loop antennas are located within each other's near field, which effectively forms an air-core transformer. For example, NFC enabled mobile device 102 may communicate with wireless device reader 120 via the inductive coupling of the reader's antenna to the mobile device's antenna. Wireless device reader 120 modulates the loading on its loop antenna in order to amplitude-modulate a radio frequency (RF) field/electromagnetic field. The modulations in the field are received and detected by the NFC enabled mobile device's antenna, thereby communicating information. In order to communicate, a transceiver module on the wireless device reader may transmit a command signal to the mobile device via the electromagnetic field (or some other energy field) powered by wireless device reader. For example, by oscillating the electromagnetic field on and off very quickly, the wireless device reader (via the transceiver module) is able to send a command as a string of data to mobile device 102. Similarly, by drawing power from the electromagnetic field or using its own power source, mobile device 102 is able to send a response to wireless device reader 120 by creating a short circuit on its own antenna. The short circuit produces a larger load on the reader's antenna, which is promptly detected as a communication from mobile device 102. An example of a near-field wireless communications standard commonly used by NFC enabled mobile devices and wireless smart cards is ISO 14443.

There are several ways in which a user may select an electronic value certificate, such as an electronic coupon, promotion, or the like. In one embodiment, the electronic value certificate may be selected by a user through a merchant's web site using a computer 104 (e.g., using a personal computer or a retail kiosk), or even a mobile device equipped with Internet browsing software. For example, the user may log into a merchant/retailer website in order to select an electronic value certificate (e.g., an electronic coupon or promotion that is associated with a good sold by the merchant). In one embodiment, the user may also designate the time and date of electronic delivery of the coupon to the recipient. The user may then be prompted to provide recipient data, such as the phone number of the recipient intended to receive the electronic value certificate (e.g., the recipient may be the user or a third party). In one embodiment, the above certificate selection information (e.g., a particular electronic coupon) and recipient information is provided to a merchant server 108.

In an alternate embodiment, the user may select an electronic value certificate using a different certificate selection device, such as smart poster 106 interfaced with mobile device 102. Generally, a smart poster is embodied as a sign, billboard, or any other form of advertising that incorporates a passive NFC tag (e.g., an RFID tag) from which the user can extract selected tag data by interfacing an NFC enabled handset with the tag. The tag data acquired may be a uniform resource locator (URL), a coupon, a ticket, a promotion, or any other type of data that is desired by the user. For example, the user may use a powered NFC enabled mobile device 102 to acquire or "pull" data (e.g., tag data) from a passive tag of a smart poster. After interfacing with smart poster 106, mobile device 102 initiates a midlet (e.g., a software client program, such as a wallet client application) that is responsible for transmitting the electronic coupon data to a backend server (e.g., merchant sever 108). Namely, the midlet is able to use the tag data to properly communicate with the proper merchant server as well as to request the proper coupon.

Upon receiving the coupon selection data and recipient data, merchant server 108 may be configured to perform a series of operations. In one embodiment, merchant server 108 sends a control SMS message to the intended recipient using the recipient data. In one embodiment, merchant server 108 may process the received coupon selection data and recipient data from the user to generate additional data. For example, merchant server 108 may generate additional electronic value certificate information such as the electronic value certificate number, the electronic value certificate image, an electronic value certificate authorization code, and the electronic value certificate validity information in response to receiving the coupon selection data (and recipient data). Likewise, merchant server 108 may generate personalization information using the certificate selection data and recipient data obtained from the user.

In one embodiment, merchant server 108 sends the above-mentioned selection and generated data to OTA provisioning server 112 via a request message. For example, the request message may be embodied as a message requesting that OTA provisioning server 112 issue a valid electronic value certificate to the recipient mobile device number provided. Upon receiving the recipient data, OTA provisioning server 112 may be configured to determine if the recipient mobile device is NFC enabled (e.g., mobile device 110) or not (e.g., mobile device 116). In one embodiment, OTA provisioning server 112 provides telecommunications operations server 122 with the mobile device number of a receiving party. Telecommunications operations server 122 may then access a database to obtain information relating to the type of mobile device (e.g., NFC enabled or otherwise) that is associated with the provided recipient number. Upon locating this device information, telecommunications operations server 122 forwards the mobile device type data to OTA provisioning server 112.

After receiving the mobile device type information (and electronic value certificate information), OTA provisioning server 112 is configured to deliver the electronic value certificate as either a softcard or via an SMS message. The manner in which the electronic value certificate may be sent depends if the recipient phone number in which the electronic value certificate is to be delivered is either an NFC enabled phone or non-NFC enabled phone. In the former case, OTA provisioning server 112 may be configured to deliver the electronic value certificate as a softcard (e.g., a softcard coupon). In one embodiment, the provisioning of a soft card over the air interface may occur over wireless connection, for example, using HTTP and TCP protocols, SMS and CAT_TP using TCP protocol. A TCP socket may be created for the provisioning connection. The physical layer of the connection may utilize, CDMA, Bluetooth, GPRS, or GSM air interface protocols. Provisioning may occur over the Internet or over a corporate or other intranet or utilizing SMS PP. Provisioning may occur automatically by providing a provisioning application on a mobile device that establishes a connection with a provisioning configuration server (e.g., OTA provisioning server 112) in response to being started or the provisioning configuration server starts the provisioning using SMS without using provisioning application on a mobile device.

Alternatively, if the phone number to which the electronic value certificate is to be delivered is associated with a non-NFC enabled phone, then OTA provisioning server 112 is configured to deliver the electronic value certificate as an authorization code or a URL via an SMS message.

In the exemplary embodiment where the receiving mobile device is NFC enabled, OTA provisioning server 112 sends a control SMS message to NFC enabled mobile device 102 using the mobile phone number provided by merchant server 108. In response, NFC enabled mobile device 102 may read the SMS control content, which triggers a midlet application (e.g., a wallet client application) that initiates a downloading process to receive an electronic value certificate from OTA provisioning server 112. NFC enabled mobile device 102 (e.g., via wallet client) may then reply to OTA provisioning server 112 with an acknowledgement message. In one embodiment, a wallet client application may comprise a software application that manages multiple softcards stored on a mobile device, such as credit cards, debit cards, electronic value certificates (e.g., electronic coupons and promotions), electronic tickets and the like. The wallet client may also be configured to ensure end-to-end protection of softcard data and payment applications with its interface for OTA provisioning as well as its management of the mobile device's secure element (not shown). The secure element may include any type of hardware and/or software structure that utilizes encryption or some other means for securing sensitive data within a mobile device.

In response to the acknowledgement message, OTA provisioning server 112 may establish a secure connection using, for example, an http, https, TCP, SMS PP, or CAT_TP protocol with NFC enabled mobile device 102 and provides certificate personalization data (e.g., similar to Track 1 and Track 2 data), electronic value certificate data, and branding or issuer marketing data (e.g., branding image, customer support number, network supported, and the like). In one embodiment, personalization data includes data that is unique to the recipient of the electronic value certificate and is typically delivered to a mobile device via secured communications. Similarly, the electronic value certificate data and personalization data may also be stored on a secure element validated within mobile device 102. In an alternate embodiment, the present subject matter may forego establishing a secure connection and storing the certificate data in the secure element. Rather, an electronic value certificate may be transmitted over an unsecured connection and stored in the mobile device's general memory.

After the download process is completed, the wallet client may display the electronic value certificate as a softcard coupon (which visually represents the electronic value certificate data and/or personalization data contained in the secure element or general memory). After the softcard coupon is stored in NFC enabled mobile device 102, the recipient may decide to use the electronic softcard coupon at an appropriate retail store or the like. For instance, after deciding to purchase a particular good at a store, the recipient brings the merchandise to the checkout register station and is prompted by the cashier to provide a method of payment. The recipient may then use mobile device 102 to select the coupon softcard to be used in the payment transaction. For example, the recipient may interface mobile device 102 with wireless device reader 120 via NFC communication. Thus, electronic coupon data and/or personalization data associated with the softcard coupon is then transferred to POS terminal 118. Namely, the transfer of this information facilitates an efficient transfer of coupon data for payment. In one embodiment, the coupon transaction may also be coupled with an electronic prepaid softcard transaction. In this particular scenario, the payment transaction would proceed normally if the combination of electronic funds (i.e., prepaid softcard and electronic coupon) is sufficient to cover the selected good(s). Otherwise the customer may be prompted to provide additional payment for the outstanding balance.

In the second embodiment mentioned above, the electronic value certificate is provided to a non-NFC enabled phone via one or more SMS messages. For example, mobile device 102 (if mobile device 102 happens to be a non-NFC enabled phone) may receive an SMS message from OTA provisioning server 112 instead of receiving an SMS control message. The received SMS message may include an electronic value certificate code. In one embodiment, the electronic value certificate code may comprise an electronic coupon code that would be associated with a designated amount that may be provided to a cashier at POS 118 as detailed below. In an alternate embodiment, the SMS message may instead include a URL that is linked to a barcode image.

After receiving the electronic coupon code, the user of mobile device 102 may decide to use the electronic coupon at a retail store or the like. For example, after selecting goods for purchase, the user presents the merchandise at the check out counter and may be prompted by the cashier to provide a method of payment. The user may then provide the electronic value certificate code (or coupon barcode image) to the cashier. The cashier may then enter the coupon code (or scan the coupon barcode image) in the POS terminal 118. In one embodiment, POS terminal 118 validates the coupon code with merchant server 108 to ensure that the electronic coupon is still valid or alternatively, that the coupon code has not been previously used. Merchant server 108 may return an acknowledgement message if the coupon code is valid.

Figure 2:
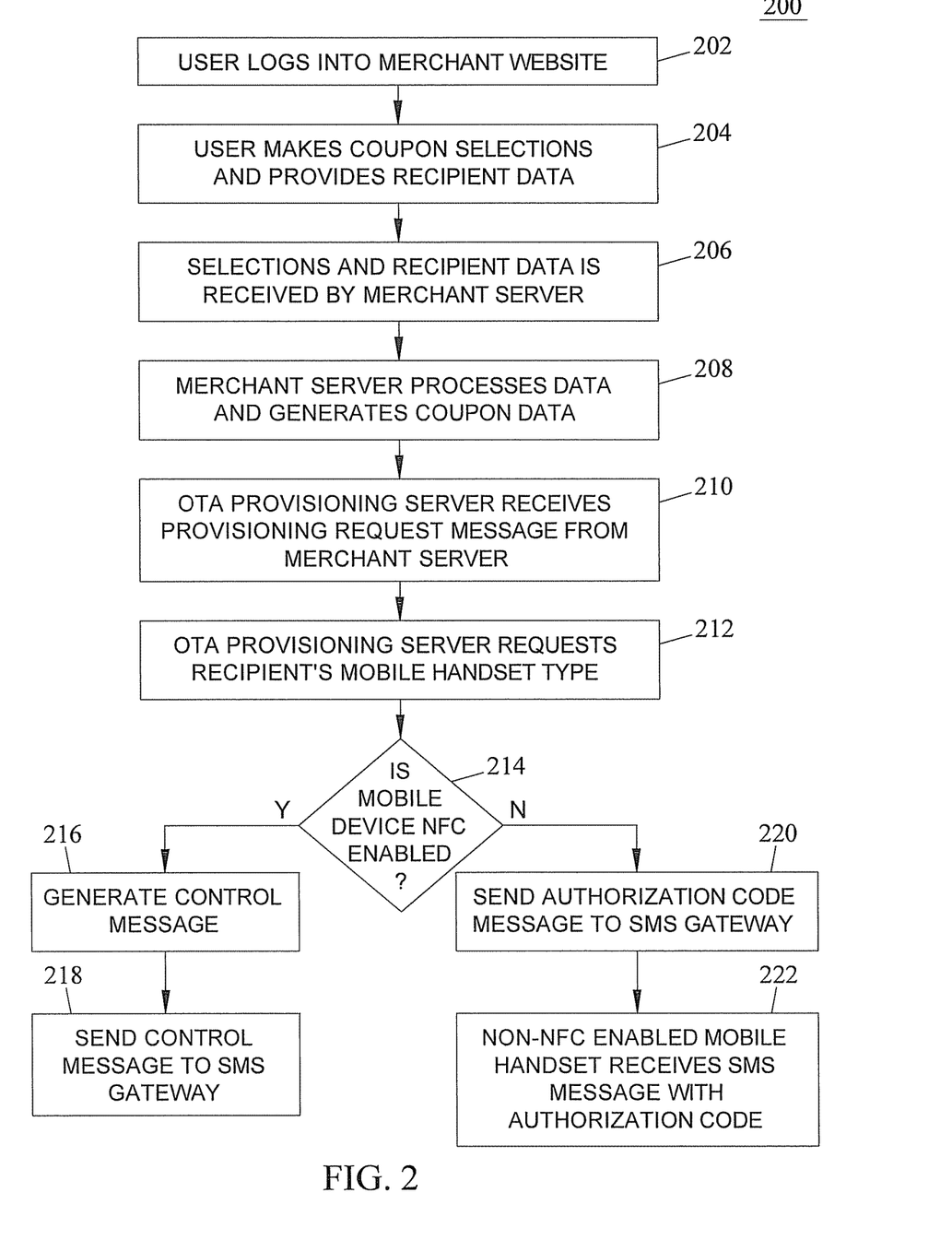
FIG. 2 is a flow chart of an exemplary process for selecting an electronic value certificate using a mobile device according to an embodiment of the subject matter described herein

To better illustrate the communication of the components depicted in FIG. 1, FIG. 2 is provided to illustrate a coupon selection process using a flow diagram. Specifically, FIG. 2 is a flow chart of an exemplary method 200 for selecting an electronic coupon according to an embodiment of the subject matter described herein. Although FIG. 2 is directed to the selection of an electronic coupon, method 200 may be used to select any electronic value certificate (e.g., a promotion) without departing from the scope of the present subject matter.

In block 202, the user logs into a merchant's website using a certificate selection device. In one embodiment, the user utilizes a personal computer or a kiosk computer station to gain access to the merchant's website.

In block 204, the user makes one or more electronic coupon selections and provides recipient data. In one embodiment, the user utilizes the website interface to select a specific type of electronic coupon (e.g., electronic certificate selection information) and possibly the date and time in which the electronic coupon should be delivered to the recipient. The user also provides recipient data, such as a mobile device phone number to be used for delivering the coupon.

In block 208, the user's coupon selections (e.g., electronic certificate selection information) and recipient data are received by a merchant server. In one embodiment, after finalizing the coupon selections and confirming the recipient data, the user electronically submits (e.g., hits the "submit" button) the information to merchant server 108.

In block 210, the merchant server processes the received data and generates electronic value certificate data. In one embodiment, merchant server 108 processes the recipient data and the coupon selection data provided by the user. For example, merchant server 108 utilizes the coupon selection data to generate other data that is unique to the electronic coupon, such as an electronic value certificate number, electronic value certificate value (e.g., electronic coupon amount), an electronic value certificate authorization code, an electronic value certificate image, electronic value certificate personalization data, and/or electronic value certificate validity information.

In block 212, an OTA provisioning server receives a provisioning request message. In one embodiment, OTA provisioning server 112 receives a message from merchant server 108 to issue an electronic coupon to a recipient that is associated with a specific mobile phone number (i.e., the mobile phone number provided by the user in block 204). The request message may also include the information generated by merchant server 108 in block 210.

In block 214, the OTA provisioning server requests the recipient's mobile device or handset type. In one embodiment, OTA provisioning server 112 sends a query to a telecommunications operations server 122 requesting the type of handset associated with the recipient's mobile device number. This information may be needed by OTA provisioning server 112 to properly deliver the electronic coupon.

In block 216, a determination is made as to whether the recipient's handset is an NFC enabled mobile device or a non-NFC enabled mobile device. If OTA provisioning server 112 ascertains that the recipient's device is an NFC enabled mobile device, then method 200 continues to block 218. Otherwise, method 200 continues to block 222 where OTA provisioning server 112 sends an electronic coupon code message to SMS gateway 114. In response (i.e., block 224), SMS gateway 114 sends an SMS message embedded with the coupon code to non-NFC enabled mobile handset.

In block 218, a control short message is generated (i.e., recipient mobile device has been determined to an NFC enabled device). In one embodiment, OTA provisioning server 112 generates a control (binary) short message service (SMS) message to instruct the recipient's NFC enabled mobile device to activate a wallet client application.

In block 220, the control short message is sent to an SMS gateway. In one embodiment, SMS gateway 114 may receive the control (binary) short message and send the SMS instruction message to recipient mobile device 102. This SMS instruction message is ultimately received by a recipient mobile device (as detailed below in FIG. 3).

Figure 3:
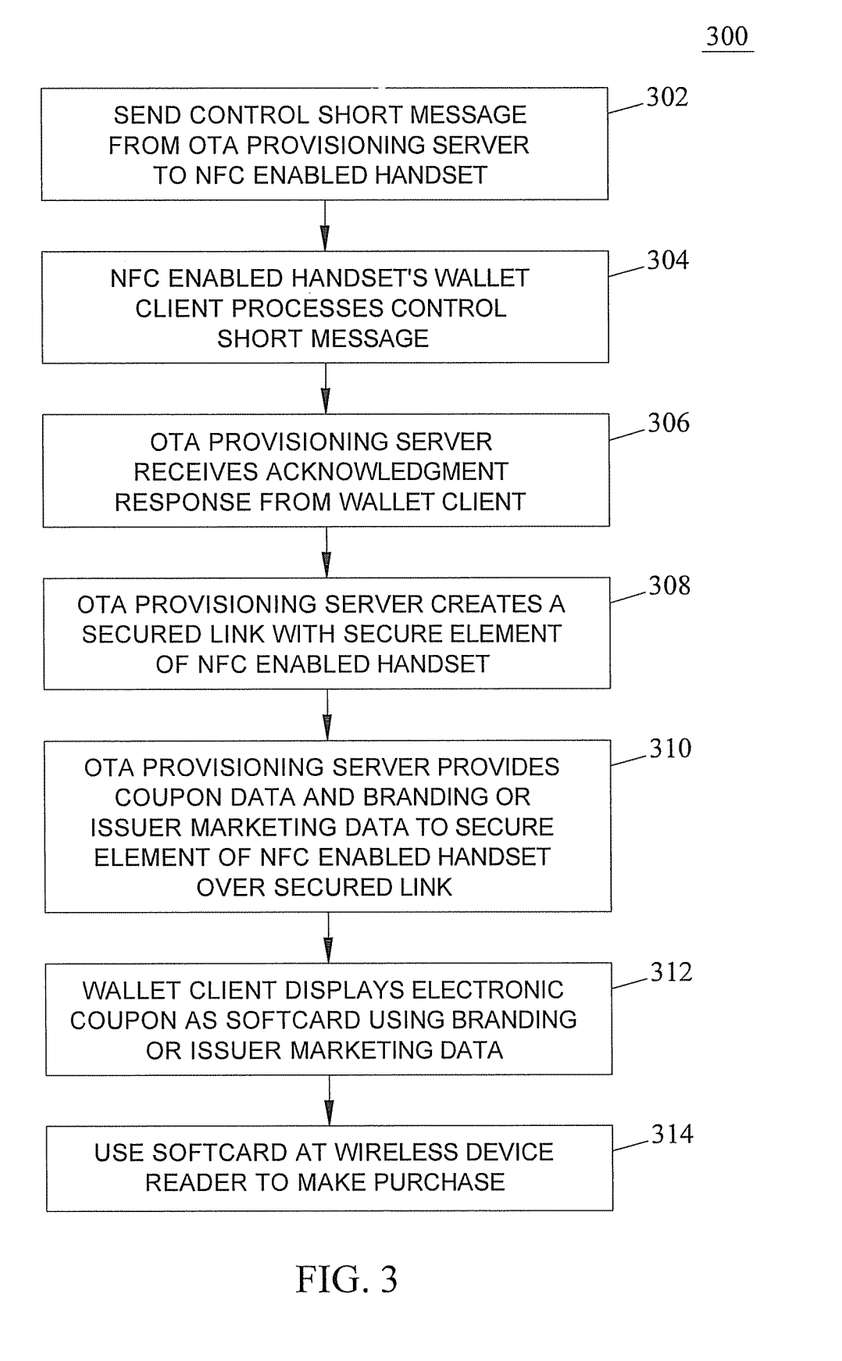
FIG. 3 is a flow chart of an exemplary database for delivering an electronic value certificate to an NFC enabled mobile device according to an embodiment of the subject matter described herein.

To better illustrate the delivery of an electronic value certificate in an NFC enabled mobile device, FIG. 3 is provided to depict a flow chart of an exemplary method 300 for delivering an electronic coupon to an NFC enabled mobile device according to an embodiment of the subject matter described herein. Although FIG. 3 is directed to the selection of an electronic coupon, method 300 may be used to select any electronic value certificate (e.g., a promotion) without departing from the scope of the present subject matter.

In block 302, a control short message is received by an NFC enabled handset. In one embodiment, OTA provisioning server 112 sends a control SMS message (via SMS gateway 114) to NFC enabled mobile device 102 (or mobile device 110).

In block 304, the NFC enabled handset processes the control SMS message. In one embodiment, a wallet client of mobile device 102 is instructed by the control short (binary) message to initiate a download process. Mobile device 102 may also send a message acknowledging receipt of the control short message to OTA provisioning server 112.

In block 306, the OTA provisioning server receives an acknowledgement message from the NFC enabled handset. In one embodiment, OTA provisioning server 112 receives a message acknowledging the receipt of the control message from the wallet client in mobile device 102.

In block 308, the OTA provisioning server creates a secure link with NFC enabled handset. In one embodiment, OTA provisioning server 112 established a secured line of communications with the wallet client and secure memory and/or mobile base band memory of mobile device 102 using GPRS, GSM, SMS.

In block 310, the OTA provisioning server provides electronic coupon personalization data over the secure link. In one embodiment, OTA provisioning server 112 uploads coupon personalization data to the secure element in mobile device 102 over the established secure link. Similarly, branding/issuer marketing data may also be uploaded to mobile device 102 along with the electronic coupon data. In an alternate embodiment, the creation of the secure link and use of a secure element in mobile device 102 is not necessary. Rather, the coupon data may be transmitted over a non-secure link and stored in general memory of mobile device 102.

In block 312, the NFC enabled handset displays the electronic coupon as a softcard. In one embodiment, the wallet client in mobile device 102 may use the branding/issuer marketing data to display the electronic coupon as a softcard coupon, which is a graphical representation associated with the stored electronic coupon personalization data.

In block 314, the softcard coupon is used at a wireless device reader to make a purchase. In one embodiment, the user of mobile device 102 (i.e., the recipient) may approach a wireless device reader 120 at a retail store and utilize the softcard coupon to make a purchase. For example, the user may select the softcard coupon from the wallet client graphical user interface (GUI) and interface the NFC enabled mobile device 102 with wireless device reader 120 (e.g., bring the two devices in close proximity). By interfacing mobile device 102 with wireless device reader 120, coupon personalization data is provided to the wireless device reader 120, which in turn provides the data to a cashier device (e.g., a POS system) in order to facilitate the payment transaction.

In alternate embodiments, the electronic coupon may be delivered to a non-NFC enabled mobile device. As indicated in block 222 of FIG. 2, OTA provisioning server 112 may send a coupon code message to SMS gateway 114. In response to the coupon code message, SMS gateway 114 sends an SMS message embedded with the coupon code to non-NFC enabled mobile device 116. In one embodiment, mobile device 116 receives the SMS message containing the coupon code and stores it on a local database or memory. The coupon data remains there until the user decides to redeem the coupon code at a POS by providing it to a cashier.

In an alternate embodiment, a non-NFC enabled mobile device may receive an SMS message that contains a URL associated with the electronic coupon. The user may use the mobile device to click on the URL, which may display a barcode in a web browser application. Afterwards, the user may present the mobile device with the displayed barcode to a cashier at a POS. The cashier may then scan the displayed bar code to redeem the coupon for the user's purchase.

In yet another embodiment, a non-NFC enabled mobile device may receive a control SMS message from the OTA provisioning server. The control SMS message instructs the mobile device to download one or more of the selected electronic coupons. The mobile device initiates the midlet, which in turn downloads the barcode image for each electronic coupon. The barcode images may then be stored in baseband memory. Afterwards, the user may present the mobile device with the displayed barcode to a cashier at a POS. The cashier may then scan the displayed bar code to redeem the coupon for the user's purchase.

Figure 4:
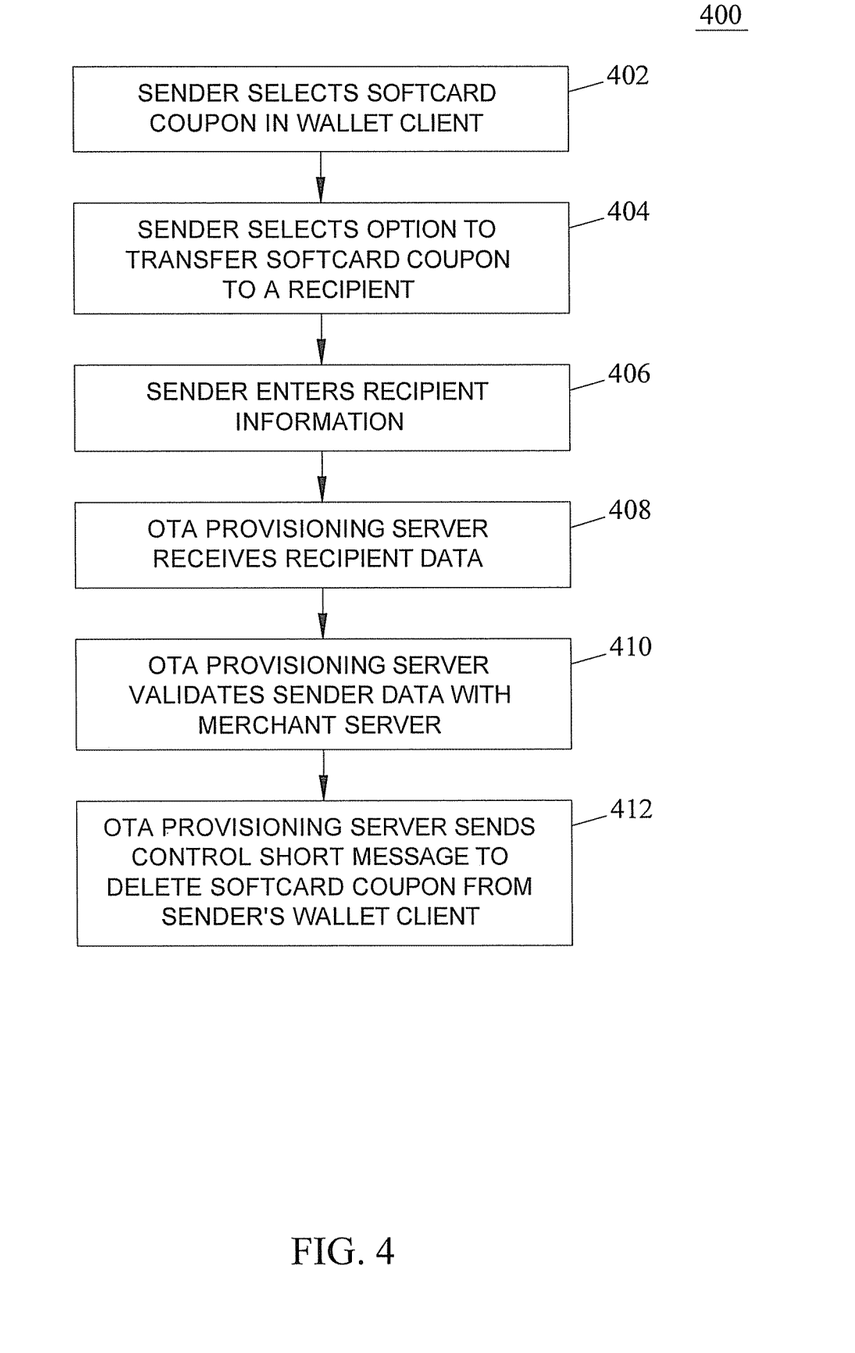
FIG. 4 is a flow chart of an exemplary process for transferring an electronic value certificate using an NFC enabled mobile device according to an embodiment of the subject matter described herein.

In another embodiment of the present subject matter, a user may decide to transfer or forward an electronic value certificate, which has been previously selected and stored on the user's NFC enabled mobile device, directly to a recipient's mobile device. FIG. 4 illustrates an exemplary method 400 for transferring an electronic softcard coupon from a user's NFC enabled mobile device (e.g., mobile device 102) to a recipient's NFC enabled mobile device (e.g., mobile device 110). Although FIG. 4 is directed to the transfer of an electronic coupon, method 400 may be used to select any electronic value certificate (e.g., a promotion) without departing from the scope of the present subject matter.

In block 402, a user selects a softcard coupon in the user's NFC enabled mobile device. In one embodiment, the user may select a previously obtained electronic coupon, which has been stored in the wallet client, for transfer.

In block 404, the user transfers the softcard coupon to a recipient. In one embodiment, the user may select an option on the mobile device's user interface to forward the electronic softcard coupon to a recipient's NFC enabled mobile device.

In block 406, the user is prompted to provide recipient information. In one embodiment, NFC enabled mobile device 102 may query the user to provide the recipient's information, such as the recipient's mobile phone number.

In block 408, the user's NFC enabled mobile device sends a transfer request. In one embodiment, NFC enabled mobile device 102 sends a transfer request message to OTA provisioning server 112. The transfer request message may include the recipient information obtained in block 406 as well as coupon personalization data associated with the user's NFC enabled mobile device (e.g., this data may only include recipient's phone number, the balance of the softcard coupon, and/or personalization data)

In block 410, the OTA provisioning server validates the user data. In one embodiment, OTA provisioning server 112 establishes communication with merchant server 108 in order to validate the coupon information with information stored on merchant server 108 (e.g., verify that the coupon is still valid). Similarly, merchant server 108 may also be provisioned with data associated with the intended recipient so as to record the transfer (i.e., the recipient is the new "owner" of the transferred electronic coupon).

In block 412, the OTA provisioning server 112 sends a control short message to delete the softcard coupon (e.g., coupon personalization data) from user's NFC enabled handset. In one embodiment, OTA provisioning server 112 may conduct the transfer of the softcard coupon by disassociating the electronic value certificate from the user's mobile device and subsequently associating the electronic value certificate to the recipient's mobile device if the information in block 410 is validated. For example, OTA provisioning server 112 may send a command to disassociate, or delete, the coupon data and/or coupon personalization data from the user's NFC enabled handset client application. Similarly, OTA provisioning server 112 may then send another control short message to the recipient's NFC enabled mobile device in order to initiate the issuing of an electronic softcard coupon. In one embodiment, OTA provisioning server 112 may transfer the "new" softcard coupon in the manner described by method 300 in FIG. 3.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for providing an electronic value certificate to a mobile device, the method comprising:
   receiving, at a merchant server, electronic certificate selection information and a mobile device phone number;
   generating, at the merchant server, electronic value certificate data using the electronic certificate selection information and the mobile device phone number, wherein the electronic value certificate data comprises an electronic certificate number, an electronic coupon amount, an electronic value certificate authorization code, an electronic value certificate image, electronic value certificate personalization data, or electronic value certificate validity information;
   receiving, at an over air (OTA) provisioning server, the mobile device phone number and the electronic value certificate data generated at the merchant server;
   determining that the mobile device phone number is associated with a near field communications (NFC) enabled mobile device;
   establishing a communications link, via the OTA provisioning server, with the NFC enabled mobile device corresponding to the mobile device phone number;
   provisioning the electronic value certificate data on the NFC enabled mobile device over the communications link via OTA communications, wherein provisioning the electronic value certificate data on the NFC enabled mobile device comprises triggering a wallet client application that initiates a downloading process to receive the electronic value certificate from the OTA provisioning server; and
   transferring the electronic value certificate from the NFC enabled mobile device to a recipient mobile device via the OTA provisioning server, wherein transferring the electronic value certificate includes deleting the electronic value certificate from the NFC enabled mobile device in response to a control short message sent to the NFC enabled mobile device by the OTA provisioning server, issuing the electronic value certificate to the recipient mobile device, and recording by the merchant server a transfer of ownership of the electronic value certificate from a user of the NFC enabled mobile device to a user of the recipient mobile device, wherein recording the transfer of ownership includes disassociating the electronic value certificate from the wallet application of the NFC enabled mobile device.

2. The method of claim 1 wherein the electronic value certificate data includes personalization data that is used to generate a softcard coupon in the NFC enabled mobile device and wherein the electronic certificate selection information includes data represents certificates selected by a user.

3. The method of claim 1 wherein the electronic value certificate data comprises the certificate authorization code.

4. The method of claim 3 wherein the certificate authorization code includes an electronic coupon authorization code.

5. The method of claim 1 wherein the electronic value certificate data comprises a short message service (SMS) message containing a uniform resource locator (URL) link to a web page displaying a barcode.

6. The method of claim 1 wherein the electronic value certificate data comprises a control short message service (SMS) message instructing the NFC enabled mobile device to download at least one barcode image of at least one coupon associated with the certificate selection information.

7. The method of claim 1 wherein establishing a communications link with a mobile device comprises:
   sending a control short message service (SMS) message to the NFC enabled mobile device associated with the mobile device phone number; and
   receiving, from the NFC enabled mobile device, an electronic value certificate download request for the electronic value certificate data.

8. The method of claim 1 further comprising:
   storing the electronic value certificate data on the NFC enabled mobile device as a softcard coupon and personalization data.

9. The method of claim 8 further comprising:
   storing the personalization data within at least one of a secure element and mobile base band memory in the NFC enabled mobile device.

10. The method of claim 9 further comprising:
    communicating the personalization data to a wireless device reader in order to conduct a purchase transaction.

11. The method of claim 1 wherein receiving, at a merchant server electronic certificate selection information comprises receiving the certificate selection information from a certificate selection device including at least one of a personal computer, a kiosk station, and a smart poster.

12. The method of claim 1 wherein the NFC enabled mobile device comprises a first NFC phone, and is configured to transfer the electronic value certificate to a second NFC phone.

13. A system for electronically providing an electronic value certificate to a mobile device, the system comprising:
    a merchant server for receiving electronic certificate selection information related to a selection of an electronic value certificate and a mobile device phone number from a certificate selection device and generating electronic value certificate data using the electronic certificate selection information and the mobile device phone number, wherein the electronic value certificate data comprises an electronic certificate number, an electronic coupon amount, an electronic value certificate authorization code, an electronic value certificate image, electronic value certificate personalization data, or electronic value certificate validity information; and
    an over air (OTA) provisioning server for receiving the mobile device phone number and the electronic value certificate selection from the merchant server, determining that the mobile device phone number is associated with a near field communications (NFC) enabled mobile device, establishing a communications link with the NFC enabled mobile device associated with the mobile device phone number and provisioning the electronic value certificate data to the NFC enabled mobile device over the communications link via over air (OTA) communications, wherein provisioning the electronic value certificate data on the NFC enabled mobile device triggers a wallet client application that initiates a downloading process to receive the electronic value certificate from the OTA provisioning server, wherein the OTA provisioning server is further configured to transfer the electronic value certificate from the NFC enabled mobile device to a recipient mobile device via the OTA provisioning server by instructing the NFC enabled mobile device to delete the electronic value certificate via a control short message sent to the NFC enabled mobile device by the OTA provisioning server and to issue the electronic value certificate to the recipient mobile device, wherein recording the transfer of ownership includes disassociating the electronic value certificate from the wallet application of the NFC enabled mobile device, and wherein a transfer of ownership of the electronic value certificate from a user of the NFC enabled mobile device to a user of the recipient mobile device is recorded by the merchant server.

14. The system of claim 13 wherein the electronic value certificate data includes personalization data that is used to generate a softcard electronic coupon in the NFC enabled mobile device and wherein the electronic certificate selection information includes data represents certificates selected by a user.

15. The system of claim 13 wherein the electronic value certificate data comprises the certificate authorization code.

16. The system of claim 15 wherein the certificate authorization code includes an electronic coupon authorization code.

17. The system of claim 13 wherein the electronic value certificate data comprises a short message service (SMS) message containing a uniform resource locator (URL) link to a web page displaying a barcode.

18. The system of claim 13 wherein the electronic value certificate data comprises a control short message service (SMS) message instructing the mobile device to download at least one barcode image of at least one coupon associated with the certificate selection information.

19. The system of claim 13 wherein the OTA provisioning server is further configured to send a control short message service (SMS) message to the NFC enabled mobile device associated with the mobile device phone number, and receive, from the NFC enabled mobile device, an electronic value certificate download request for the electronic value certificate data.

20. The system of claim 13 wherein the OTA provisioning server is further configured to upload the electronic value certificate data to the NFC enabled mobile device as a softcard coupon and personalization data.

21. The system of claim 20 wherein the personalization data is provisioned to at least one of a secure element and mobile base band memory in the NFC enabled mobile device.

22. The system of claim 21 wherein the NFC enabled mobile device is adapted to communicate the personalization data to a wireless device reader in order to conduct a purchase transaction.

23. The system of claim 13 wherein the certificate selection device includes at least one of a personal computer, a kiosk station, and a smart poster.

24. The system of claim 13 wherein the NFC enabled mobile device comprises a first NFC phone, and is configured to transfer the electronic value certificate to a second NFC phone.

25. A non-transitory computer readable medium having stored thereon computer executable instructions that when executed by a processor of a computer performs steps comprising:

receiving electronic certificate selection information and a mobile device phone number;

generating electronic value certificate data using the electronic certificate selection information and the mobile device phone number, wherein the electronic value certificate data comprises an electronic certificate number, an electronic coupon amount, an electronic value certificate authorization code, an electronic value certificate image, electronic value certificate personalization data, or electronic value certificate validity information;

receiving the mobile device phone number and the electronic value certificate data generated at the merchant server;

determining that the mobile device phone number is associated with a near field communications (NFC) enabled mobile device;

establishing a communications link with the NFC enabled mobile device corresponding to the mobile device phone number;

provisioning the electronic value certificate data on the NFC enabled mobile device over the communications link via over air (OTA) communications, wherein provisioning the electronic value certificate data on the NFC enabled mobile device triggers a wallet client application that initiates a downloading process to receive the electronic value certificate from an OTA provisioning server; and transferring the electronic value certificate from the NFC enabled mobile device to a recipient mobile device via the OTA provisioning server, wherein transferring the electronic value certificate includes deleting the electronic value certificate from the NFC enabled mobile device in response to a control short message sent to the NFC enabled mobile device by the OTA provisioning server, issuing the electronic value certificate to the recipient mobile device, and recording by the merchant server a transfer of ownership of the electronic value certificate from a user of the NFC enabled mobile device to a user of the recipient mobile device, wherein recording the transfer of ownership includes disassociating the electronic value certificate from the wallet application of the NFC enabled mobile device.

* * * * *